United States Patent [19]
Kent

[11] Patent Number: 5,944,333
[45] Date of Patent: Aug. 31, 1999

[54] UTILITY CART FOR BEACH GEAR

[76] Inventor: Kimberly Kay Kent, 2918 Jarvis, San Diego, Calif. 92106

[21] Appl. No.: 08/800,453

[22] Filed: Feb. 18, 1997

[51] Int. Cl.[6] .............................. B62B 1/12; B62K 27/10
[52] U.S. Cl. .................. 280/204; 280/47.19; 280/47.315
[58] Field of Search .............................. 280/47.17, 47.19, 280/47.24, 47.25, 47.26, 47.27, 47.315, 47.3, 47.34, 47.35, 63, 30, 204, 1.5, 292, 33.992, 33.991, 33.997

[56] References Cited

U.S. PATENT DOCUMENTS

| | | | |
|---|---|---|---|
| 1,149,807 | 8/1915 | Bascom | 280/480 |
| 2,065,233 | 12/1936 | Mallett | 280/30 |
| 2,479,530 | 8/1949 | Watson | 280/47 |
| 2,840,142 | 6/1958 | Sands | 280/30 |
| 2,980,442 | 4/1961 | Krokos et al. | 280/63 |
| 3,288,481 | 11/1966 | Meyers | 280/47.27 |
| 3,519,286 | 7/1970 | Andersen | 280/33.99 |
| 3,677,571 | 7/1972 | Maturo, Jr. et al. | 280/36 |
| 3,693,993 | 9/1972 | Mazzarelli et al. | 280/30 |
| 3,758,128 | 9/1973 | Stenwall | 280/47.25 |
| 3,827,369 | 8/1974 | Mueller | 104/118 |
| 3,829,113 | 8/1974 | Epelbaum | 280/30 |
| 3,997,181 | 12/1976 | Jaco et al. | 280/47.19 |
| 4,037,853 | 7/1977 | Sparks | 280/204 |
| 4,306,733 | 12/1981 | Cox | 280/204 |
| 4,725,067 | 2/1988 | Lundy | 280/204 |
| 4,832,362 | 5/1989 | Chen | 280/645 |
| 4,886,233 | 12/1989 | Bateman et al. | 248/647 |
| 4,907,674 | 3/1990 | Miller | 182/150 |
| 4,921,261 | 5/1990 | Sadler, Jr. et al. | 280/30 |
| 5,005,847 | 4/1991 | King et al. | 280/47.19 |
| 5,062,650 | 11/1991 | Chang | 297/129 |
| 5,160,154 | 11/1992 | Seydel et al. | 280/47.19 |
| 5,203,815 | 4/1993 | Miller | 43/21.2 |
| 5,257,892 | 11/1993 | Branch | 414/490 |
| 5,318,311 | 6/1994 | Bofill | 280/30 |
| 5,328,192 | 7/1994 | Thompson | 280/47.24 |
| 5,333,885 | 8/1994 | Pullman | 280/47.19 |
| 5,338,054 | 8/1994 | Imai et al. | 280/655 |
| 5,460,395 | 10/1995 | Chen | 280/204 |
| 5,480,170 | 1/1996 | Kaiser, II | 280/30 |
| 5,622,300 | 4/1997 | Robinson | 224/575 |
| 5,636,852 | 6/1997 | Sistrunk | 280/30 |
| 5,660,403 | 8/1997 | O'Neill et al. | 280/47.19 |

*Primary Examiner*—Lanna Mai
*Assistant Examiner*—Bridget Avery

[57] ABSTRACT

A utility cart for beach gear including a base portion with an L-shaped frame member. The L-shaped frame member includes a vertical member and a horizontal member. The horizontal member has a planar support secured therebetween. The horizontal member has a pair of brackets extending downwardly therefrom. A pair of wheels having an axle extending therebetween is rotatably received within the pair of brackets of the horizontal member. A bicycle securement portion engages a frame of a bicycle and the base portion for the transportation of beach gear to and from a beach area.

10 Claims, 3 Drawing Sheets

UTILITY CART FOR BEACH GEAR

BACKGROUND OF THE INVENTION

1. Field of the Invention

The present invention relates to a utility cart for beach gear and more particularly pertains to transporting beach supplies to and from a beach with a utility cart for beach gear.

2. Description of the Prior Art

The use of transport carts is known in the prior art. More specifically, transport carts heretofore devised and utilized for the purpose of transporting cargo are known to consist basically of familiar, expected and obvious structural configurations, notwithstanding the myriad of designs encompassed by the crowded prior art which have been developed for the fulfillment of countless objectives and requirements.

In this respect, the utility cart for beach gear according to the present invention substantially departs from the conventional concepts and designs of the prior art, and in doing so provides an apparatus primarily developed for the purpose of transporting beach supplies to and from a beach.

Therefore, it can be appreciated that there exists a continuing need for new and improved utility cart for beach gear which can be used for transporting beach supplies to and from a beach. In this regard, the present invention substantially fulfills this need.

SUMMARY OF THE INVENTION

In the view of the foregoing disadvantages inherent in the known types of transport carts now present in the prior art, the present invention provides an improved utility cart for beach gear. As such, the general purpose of the present invention, which will be described subsequently in greater detail, is to provide a new and improved utility cart for beach gear and method which has all the advantages of the prior art and none of the disadvantages.

To attain this, the present invention essentially comprises a base portion comprised of an L-shaped frame member. The L-shaped frame member is constructed of hollow tubular supports. The L-shaped frame member includes a vertical member and a horizontal member with the vertical member extending upwardly from the horizontal member in an orthogonal relationship. The vertical member has vertical and horizontal cross members extending therewithin. The vertical member has a rigid mesh screen secured thereto. The rigid mesh screen has a plurality of circular openings therethrough. The horizontal member has a downturned end portion. The horizontal member has a planar support secured therebetween. The horizontal member has a pair of brackets extending downwardly therefrom. The rigid mesh screen has an intermediate shelf adjustably secured thereto. The intermediate shelf has brackets on a lower surface thereof adjacent to opposed ends. The brackets are extendable within the rigid mesh screen for securement thereto. The device includes a pair of spherical wheels having an axle extending therebetween. The axle is rotatably received within the pair of brackets of the horizontal member. A cylindrical tube is secured to a side extent of the vertical member. The cylindrical tube has an open upper end and a closed lower end. The cylindrical tube is dimensioned for receiving a beach umbrella therein. A plurality of securement straps is secured intermittently around the vertical member. Each of the securement straps have hook and loop fasteners disposed on free ends thereof. A plurality of pouches comprised of an enlarged planar panel is secured to and extends downwardly from the horizontal cross-member of the vertical member. The planar panel has one large pouch and two small pouches coupled thereto. An extendable handle extends outwardly of the vertical cross-member of the vertical member. The extendable handle has a stowed and an extended orientation. The device includes a bicycle securement portion comprising a generally U-shaped member. The U-shaped member has hooked free ends. The U-shaped member engages a frame of a bicycle with the free ends coupling with the L-shaped frame member. The U-shaped member has a pair of straps extending therefrom. Each of the straps has a hook and loop fastener disposed on a free end thereof. The straps extend around the bicycle frame and coupled together.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved utility cart for beach gear which has all the advantages of the prior art transport carts and none of the disadvantages.

It is another object of the present invention to provide a new and improved utility cart for beach gear which may be easily and efficiently manufactured and marketed.

It is a further object of the present invention to provide a new and improved utility cart for beach gear which is of durable and reliable construction.

An even further object of the present invention is to provide a new and improved utility cart for beach gear which is susceptible of a low cost of manufacture with regard to both materials and labor, and which accordingly is then susceptible of low prices of sale to the consuming public, thereby making such a utility cart for beach gear economically available to the buying public.

Even still another object of the present invention is to provide a new and improved utility cart for beach gear for transporting beach supplies to and from a beach.

Lastly, it is an object of the present invention to provide a new and improved utility cart for beach gear including a base portion comprised of an L-shaped frame member. The L-shaped frame member includes a vertical member and a horizontal member. The horizontal member has a planar support secured therebetween. The horizontal member has a pair of brackets extending downwardly therefrom. A pair of wheels having an axle extending therebetween is rotatably received within the pair of brackets of the horizontal member. A bicycle securement portion engages a frame of a bicycle and the base portion for the transportation of beach gear to and from a beach area.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

With reference now to the drawings, and in particular, to FIGS. 1 through 6 thereof, the preferred embodiment of the new and improved utility cart for beach gear embodying the principles and concepts of the present invention and generally designated by the reference number 10 will be described.

Specifically, it will be noted in the various Figures that the device relates to a utility cart for beach gear for transporting beach supplies to and from a beach. In its broadest context, the device consists of a base portion, a pair of spherical wheels, a cylindrical tube, a plurality of pouches, an extendable handle and a bicycle securement portion. Such components are individually configured and correlated with respect to each other so as to attain the desired objective.

Figure 1:
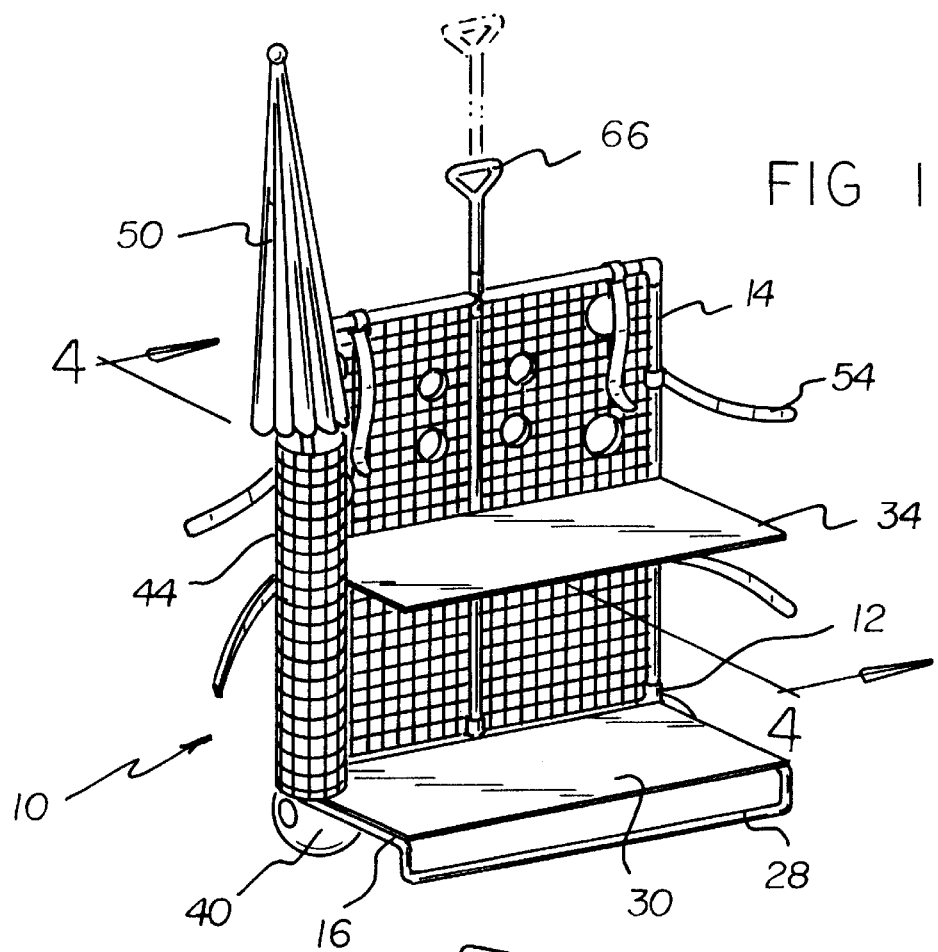
FIG. 1 is a perspective view of the preferred embodiment of the utility cart for beach gear constructed in accordance with the principles of the present invention.
Figure 2:
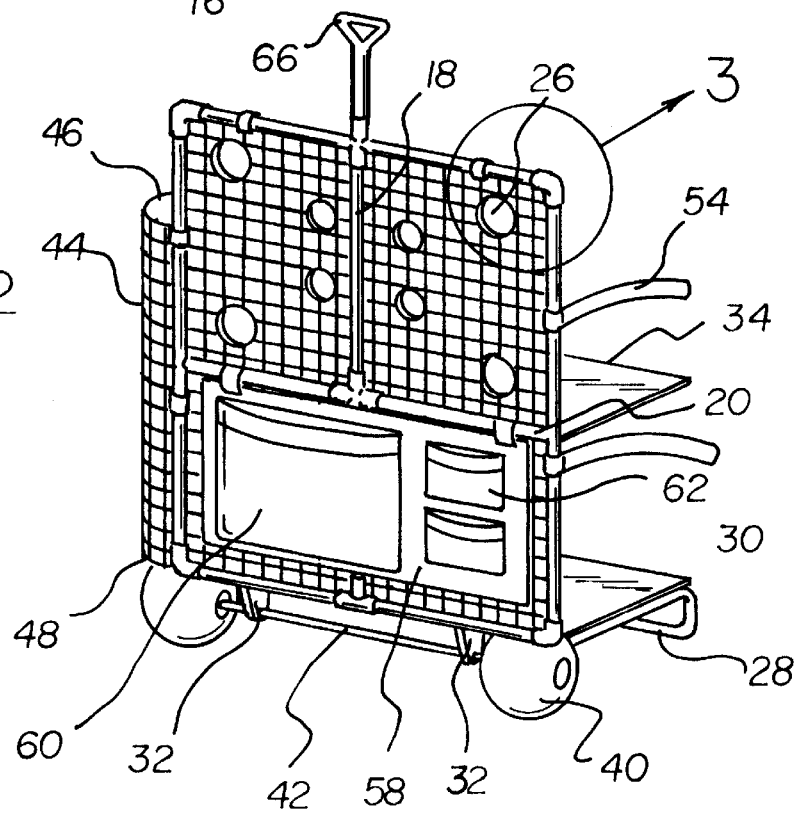
FIG. 2 is a rear perspective view of the present invention.
Figure 3:
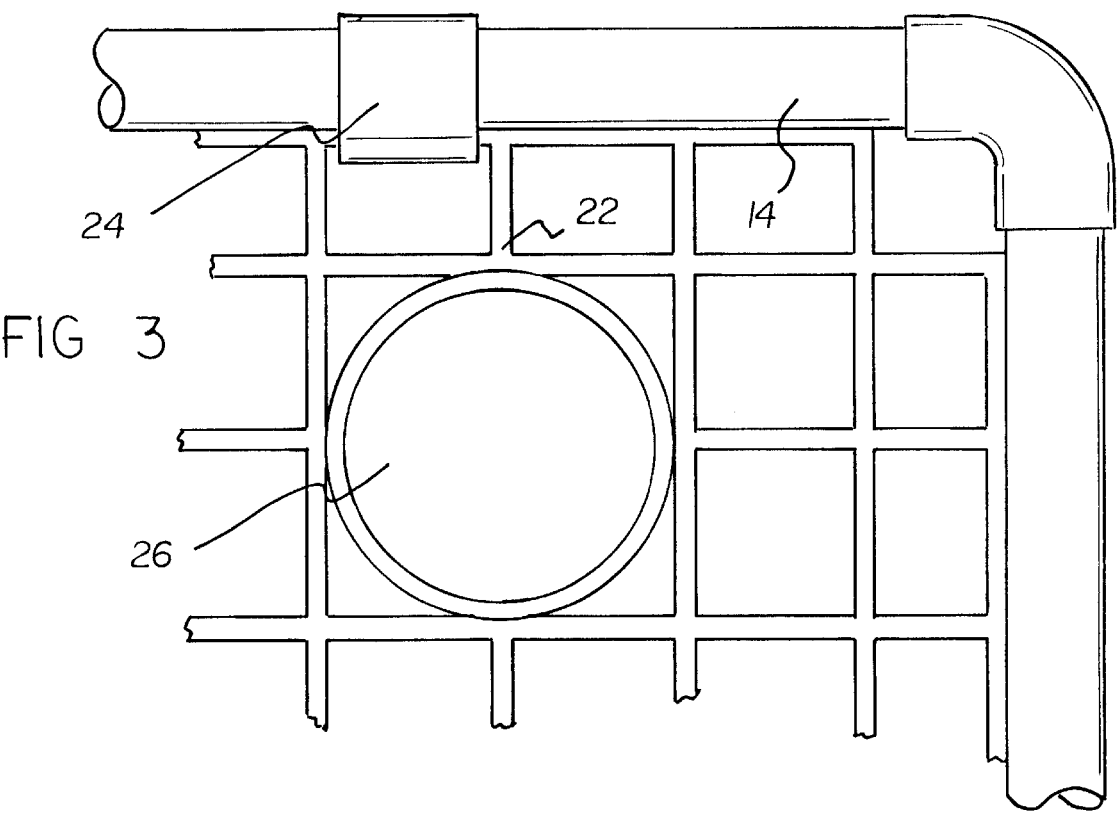
FIG. 3 is a fragmentary view of the present invention as taken from circle 3 of FIG. 2.
Figure 4:
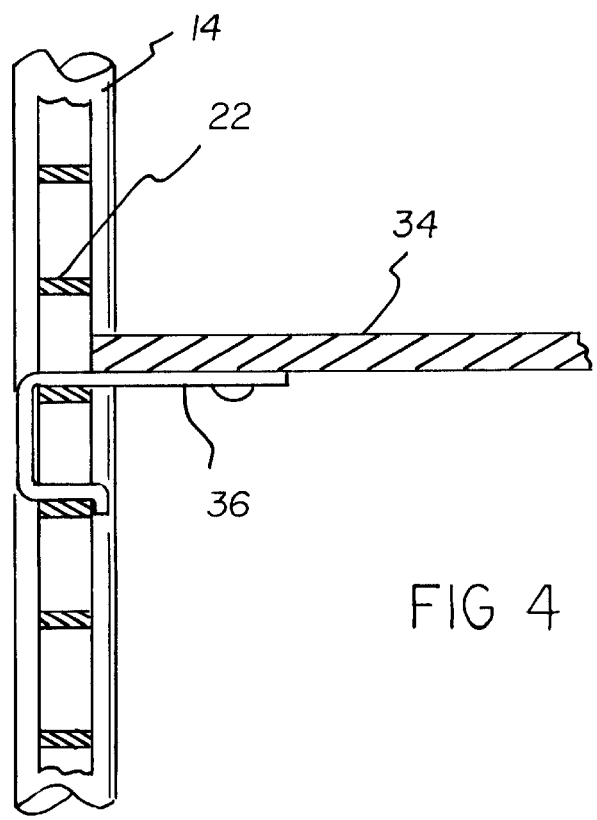
FIG. 4 is a cross-sectional view as taken along line 4—4 of FIG. 1.

FIGS. 1 and 2 illustrate, in detail, a base portion comprised of an L-shaped frame member 12. The L-shaped frame 12 member is constructed of hollow tubular supports. The L-shaped frame member 12 includes a vertical member 14 and a horizontal member 16 with the vertical member 14 extending upwardly from the horizontal member 16 in an orthogonal relationship. The vertical member 14 has vertical 18 and horizontal cross members 20 extending therewithin. The vertical member 14 has a rigid mesh screen 22 secured thereto. The securement of the rigid mesh screen 22 is facilitated through the use of rigid bands 24 disposed around the vertical member 14. Note FIG. 3. The rigid mesh screen 22 has a plurality of circular openings 26 therethrough. The circular openings 26 are dimensioned for holding a beverage container when the vertical member 14 lays down flat. The horizontal member 16 has a downturned end portion 28. The horizontal member 16 has a planar support 30 secured therebetween. The horizontal member 16 has a pair of brackets 32 extending downwardly therefrom. The rigid mesh screen 22 has an intermediate shelf 34 adjustably secured thereto. The intermediate shelf 34 has brackets 36 on a lower surface thereof adjacent to opposed ends. The brackets 36 are extendable within the rigid mesh screen 22 for securement thereto. Note FIG. 4.

Next, the device 10 includes a pair of spherical wheels 40 having an axle 42 extending therebetween. The axle 42 is rotatably received within the pair of brackets 32 of the horizontal member 16. The shape of the wheels 40 is beneficial in transporting the device 10 over rough terrain, such as a sandy beach.

A cylindrical tube 44 is secured to a side extent of the vertical member 14. The cylindrical tube 44 has an open upper end 46 and a closed lower end 48. The cylindrical tube 44 is dimensioned for receiving a beach umbrella 50 therein. The cylindrical tube 44 is preferably constructed of the rigid mesh material and is integrally formed with the base portion.

A plurality of securement straps 54 are secured intermittently around the vertical member 14. Each of the securement straps 54 have hook and loop fasteners disposed on free ends thereof. The securement straps 54 allow for the securement of miscellaneous beach supplies to the device 10 for safe transportation to and from the beach area.

A plurality of pouches comprised of an enlarged planar panel 58 is secured to and extends downwardly from the horizontal cross-member 34 of the vertical member 14. The planar panel 58 has one large pouch 60 and two small pouches 62 coupled thereto. The plurality of pouches allow for small items to be stored therein.

An extendable handle 66 extends outwardly of the vertical cross-member 18 of the vertical member 14. The extendable handle 66 has a stowed and an extended orientation. The extendable handle 66 can be adjusted to facilitate manual transportation of the device 10.

Figure 5:
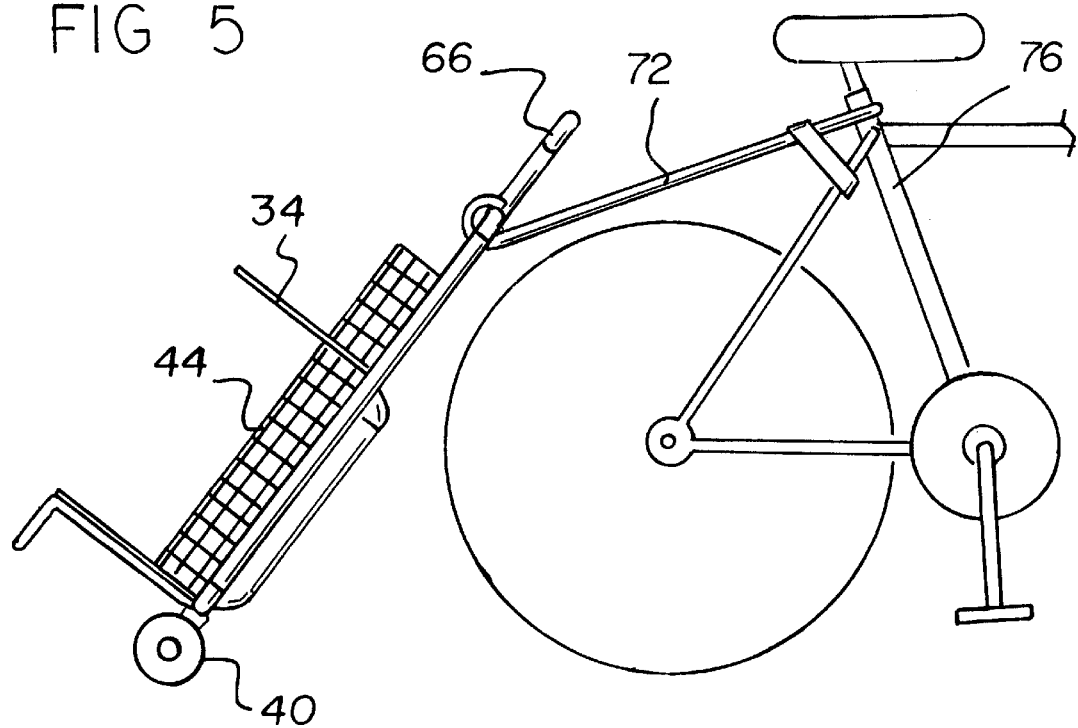
FIG. 5 is a side view of the present invention shown attached to a bicycle.
Figure 6:
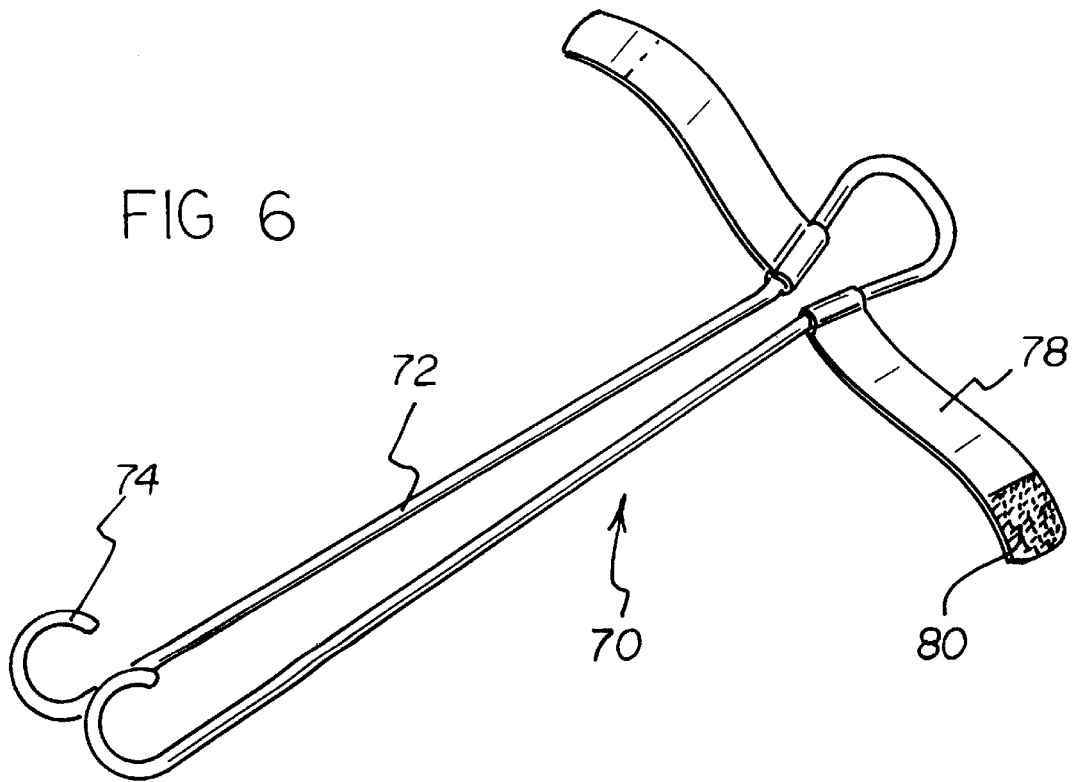
FIG. 6 is a plan perspective view of the attachment bracket for coupling to the bicycle.

Lastly, illustrated in FIGS. 5 and 6, the device includes a bicycle securement portion 70 comprising a generally U-shaped member 72. The U-shaped member 72 has hooked free ends 74. The U-shaped member 72 engages a frame 76 of a bicycle with the free ends 74 coupling with the L-shaped frame member 12. Note FIG. 5. The U-shaped member 72 has a pair of straps 78 extending therefrom. Each of the straps 78 has a hook and loop fastener 80 disposed on a free end thereof. The straps 78 extend around the bicycle frame 76 and are coupled together to form a closure around the bicycle frame 76 to allow for the transportation of the utility cart via the bicycle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A utility cart for beach gear for transporting beach supplies to and from a beach comprising, in combination:

a base portion comprised of an L-shaped frame member, the L-shaped frame member constructed of hollow tubular supports, the L-shaped frame member including a vertical member and a horizontal member with the vertical member extending upwardly from the horizontal member in an orthogonal relationship, the vertical member having vertical and horizontal cross-members extending therewithin, the vertical member having a rigid mesh screen secured thereto, the rigid mesh screen having a plurality of circular openings therethrough, the horizontal member having a downturned end portion, the horizontal member having a planar support secured therebetween, the horizontal member having a pair of brackets extending downwardly therefrom, the rigid mesh screen having an intermediate shelf adjustably secured thereto, the intermediate shelf having brackets on a lower surface thereof adjacent to opposed ends, the brackets extendable within the rigid mesh screen for securement thereto;

a pair of spherical wheels having an axle extending therebetween, the axle rotatably received within the pair of brackets of the horizontal member;

a cylindrical tube secured to a side extent of the vertical member, the cylindrical tube having an open upper end and a closed lower end, the cylindrical tube dimensioned for receiving a beach umbrella therein;

a plurality of securement straps secured intermittently around the vertical member, each of the the securement straps having hook and loop fasteners disposed on free ends thereof;

a plurality of pouches comprised of an enlarged planar panel secure to and extending downwardly from the horizontal cross-member of the vertical member, the planar panel having one large pouch and two small pouches coupled thereto;

an extendable handle extending outwardly of the vertical cross-member of the vertical member, the extendable handle having a stowed and an extended orientation; and a bicycle securement portion comprising a generally U-shaped member, the U-shaped member having hooked free ends, the U-shaped member engaging a frame of a bicycle with the free ends coupling with the L-shaped frame member, the U-shaped member having a pair of straps extending therefrom, each of the straps having a hook and loop fastener disposed on a free end thereof, the straps extending around the bicycle frame and coupled together.

2. A utility cart for beach gear comprising:

a base portion comprised of an L-shaped frame member, the L-shaped frame member including a vertical member and a horizontal member, the horizontal member having a planar support secured therebetween, the horizontal member having a pair of brackets extending downwardly therefrom;

a pair of wheels having an axle extending therebetween, the axle rotatably received within the pair of brackets of the horizontal member;

a bicycle securement portion engaging a frame of a bicycle and the base portion; the bicycle securement portion comprising a generally U-shaped member, the U-shaped member having hooked free ends, the U-shaped member engaging a frame of a bicycle with the free ends coupling with the L-shaped frame member, the U-shaped member having a pair of straps extending therefrom, each of the straps having a hook and loop fastener disposed on a free end thereof, the straps extending around the bicycle frame and coupled together;

the utility cart further including a plurality of securement straps secured intermittently around the vertical member, each of the securement straps having hook and loop fasteners disposed on free ends thereof, the plurality of securement straps enabling a plurality of different objects to be retained around the vertical member.

3. The utility cart as set forth in claim 2 wherein the vertical member having vertical and horizontal cross-members extending therewithin.

4. The utility cart as set forth in claim 2 wherein the vertical member having rigid mesh screen secured thereto, the rigid mesh screen having a plurality of circular openings therethrough, the circular openings being dimensioned to securely hold a beverage container with the vertical member disposed in a horizontal orientation.

5. The utility cart as set forth in claim 4 wherein the rigid mesh screen having an intermediate shelf adjustably secured thereto.

6. The utility cart as set forth in claim 5 wherein the intermediate shelf has brackets on a lower surface thereof adjacent to opposed ends, the brackets extendable within the rigid mesh screen at any vertical location for releasable securement thereto.

7. The utility cart as set forth in claim 2 wherein the pair of wheels each being spherical.

8. The utility cart as set forth in claim 2 and further including a cylindrical tube secured to a side extent of the vertical member, the cylindrical tube having an open upper end and a closed lower end, the cylindrical tube dimensioned for receiving a beach umbrella therein.

9. The utility cart as set forth in claim 2 and further including a plurality of pouches comprised of an enlarged planar panel secure to and extending downwardly from the vertical member, the planar panel having one large pouch and two small pouches coupled thereto.

10. The utility cart as set forth in claim 3 and further including an extendable handle extending outwardly of the vertical cross-member of the vertical member, the extendable handle having a stowed and an extended orientation.

* * * * *